(12) United States Patent
Beau

(10) Patent No.: US 7,089,953 B2
(45) Date of Patent: Aug. 15, 2006

(54) CONTROLLED PNEUMATIC DEVICE FOR AUTOMATIC INFLATING/DEFLATING OF A CONFINEMENT CAPACITY OF A GAS FLUID UNDER RELATIVE PRESSURE

(76) Inventor: Henri Beau, "Le Verdier", F-42260 Saint Polgues (FR)

( * ) Notice: Subject to any disclaimer, the term of this patent is extended or adjusted under 35 U.S.C. 154(b) by 354 days.

(21) Appl. No.: 10/473,647

(22) PCT Filed: Mar. 28, 2002

(86) PCT No.: PCT/FR02/01126

§ 371 (c)(1),
(2), (4) Date: Sep. 29, 2003

(87) PCT Pub. No.: WO02/078984

PCT Pub. Date: Oct. 10, 2002

(65) Prior Publication Data

US 2004/0103939 A1    Jun. 3, 2004

(30) Foreign Application Priority Data

Mar. 30, 2001   (FR) .................................. 01 04321

(51) Int. Cl.
*B60C 23/00*   (2006.01)
*F16K 31/365*   (2006.01)

(52) U.S. Cl. ...................... 137/102; 137/225; 137/907; 152/416

(58) Field of Classification Search ................ 137/102, 137/224, 225, 907; 152/416
See application file for complete search history.

(56) References Cited

U.S. PATENT DOCUMENTS

| 2,685,906 | A | * | 8/1954 | Williams ...................... 137/224 |
| 4,678,017 | A | * | 7/1987 | Schultz ........................ 152/416 |
| 4,735,232 | A | * | 4/1988 | Apostoly et al. ........... 137/225 |
| 4,765,385 | A | * | 8/1988 | McGeachy .................. 152/416 |
| 4,782,879 | A | * | 11/1988 | Le Chatelier et al. ...... 137/225 |
| 4,877,048 | A | * | 10/1989 | Oltean et al. ................ 137/225 |
| 4,922,946 | A | * | 5/1990 | Boulicault .................. 137/102 |
| 5,313,995 | A |   | 5/1994 | Schultz |
| 2004/0020534 | A1 |   | 2/2004 | Beau |

FOREIGN PATENT DOCUMENTS

| EP | 0 511 135 A | 10/1992 |
| FR | 2 731 655 A | 9/1996 |
| WO | WO 02/066268 | 8/2002 |

* cited by examiner

*Primary Examiner*—John Rivell
(74) *Attorney, Agent, or Firm*—Hoffmann & Baron, LLP; Irving N. Feit

(57) ABSTRACT

The invention concerns a controlled pneumatic valve (1), for remote inflating and deflating of a capacity (2), comprising a membrane (17) maintained between a valve body (18), including orifices (24) and a cover (19); and defining with said cover a control chamber (20) and with the body an escape chamber (21), the latter being capable of being connected with the capacity (2) for deflation when the check valve (28) is thrust by levers (32) inverting the direction of movement of the membrane (17) sucked towards the cover (19). By the action of a pressure in the control chamber (20), the membrane (17), bearing a cup (33) with an annular conduit, moves towards the body (18), isolates the escape chamber (21), and opens the check valve (28) by direct thrust to perform inflation. The inventive device is particularly designed to control and adjust tire pressure.

12 Claims, 3 Drawing Sheets

CONTROLLED PNEUMATIC DEVICE FOR AUTOMATIC INFLATING/DEFLATING OF A CONFINEMENT CAPACITY OF A GAS FLUID UNDER RELATIVE PRESSURE

BACKGROUND OF THE INVENTION

The present invention relates to the technical sector of remote control of inflation and deflation of a capacity from a source of gaseous fluid under relative pressure, and it more particularly relates to the remote control of the inflation pressure of the tires of automobiles and all terrain machines with wheels for industrial, agricultural, civilian or military uses, In the preferred domains of application above, it is known that it is sometimes useful to be able to remotely control the inflation pressure of the tires of a vehicle, so that it is possible to adapt the supporting ability of these tires as a function of the state of the ground on which the vehicle is moving.

This is the case in particular for all-terrain vehicles which must be able to advance under the best conditions over hard, pebbled, loose ground surfaces capable of alternating, without the driver being obliged to stop in order to manually modify the inflation pressure of the different tires.

It is also the case for agricultural machines such as tractors, towed elements, self-propelled harvesters which, in addition to the problems of advancing in loose ground, must limit the packing of the ground and the formation of ruts in the fields, and handle transports on the road without deterioration of the tires.

These applications are only given as examples because in numerous domains, it also proves useful or even necessary to be able to adapt at a distance the inflation pressure of a certain capacity for containment of a gaseous fluid under relative pressure.

In order to solve this problem above, prior art offers some solutions.

Thus, French patent 9105351 describes a pneumatic valve which has a membrane which moves a cup which has a hole and a seat for a flap, a mobile apparatus of two flaps in opposition, respectively for inflation and outflow, which is sensitive to the position of the membrane, an elastic component which acts on the apparatus in order to maintain the inflation flap in closed position on the seat connected to the membrane, some elastic means associated with the membrane for maintaining the outflow flap in closed position on a seat arranged in the base of the valve, a stop which limits the course of travel of the outfit in opening of the outflow valve. The control of the deflation is ensured by a low positive pressure.

Such a valve partly corresponds to the desired function, but has limitations of use. In effect, the positive control pressure imposes a limit on the minimum pressures which are measurable and prohibits its use for the lowest pressures used on very loose terrain and in particular for agricultural work. Furthermore, its manufacturing which requires a large number of parts is delicate and expensive.

Another known proposal of prior art concerns a controlled pneumatic valve which is described in patent EP-0 296 017, valve which has a membrane connected to a flap automatically controlled and maintained between a half-body and a grooved ring which, with the half-body, delimits a control chamber, and with the grooved ring, delimits an outflow chamber, the latter communicating with a hole which opens in the capacity, the control chamber being subjected to a circuit of pressure-vacuum through a hose, said automatically controlled flap pushing the membrane to close the bore and coaxially incorporating a check valve. Such a valve gives satisfaction but has a certain number of disadvantages.

For example, in case of off-center mounting on the wheel, which is ordinarily imposed by the configuration of the hub, the centrifugal force acts on the ball of the check valve and interferes with closing of this valve at high speed, causing gradual deflation of the tire.

This valve is furthermore difficult to use for agricultural type vehicles with very negative pressures because of the lack of sealing of the check valve, the bearing forces which depend on the pressure held in the capacity not being sufficient to complete the contact between the ball and the seat of the flap.

The present invention aims to solve the problems mentioned previously by providing a simple and inexpensive device which is completely reliable and which can be used in a wide range of pressure and speed.

SUMMARY OF THE INVENTION

The invention therefore relates to a controlled pneumatic valve, intended for remote control of the inflation and deflation of a capacity, which has a membrane maintained between a body and a cover and which delimits a control chamber on the cover side and an outflow chamber on the body side, with it possible for the latter to be put in communication, according to the position of the membrane imposed by the control pressure, on one hand, with a pipe which is normally closed by a flap at rest, and opening into the capacity in the case of deflation, and on the other hand, can be isolated from the atmosphere by a tubular collar which at the same time allows passage of the gaseous fluid between the control chamber and the capacity in the case of inflation.

According to one characteristic, the valve has levers which are moved by a cup connected to the membrane, said levers resting on a stationary part of the cover or of the body, and bringing about the reversal of the direction of the force provided by the membrane during application of a negative pressure, thus ensuring the opening of the flap for isolation of the capacity under the action of a positive control pressure as well as a negative control pressure with respect to the surrounding pressure.

According to another characteristic, the levers are attached on a ring which holds them in position.

In a particular construction arrangement, the ring on which the levers are attached consists of a Belleville spring washer.

Advantageously, the levers are two in number, arranged symmetrically, and are part of the Belleville spring washer.

According to another characteristic, the stationary part on which the levers rest has a sealing ring which can close the annular pipe which connects the control chamber with the outflow chamber.

According to another characteristic, the end of the levers acts on a control rod of the outflow flap which has a maneuvering plate, and the orientation of the levers with respect to the surface of the maneuvering plate is such that, at the beginning of the deflation course of travel, one obtains a high lever arm ratio making it possible to limit the maximum negative pressure value necessary for opening the flap, while at the end of the deflation course of travel, the arm ratio decreasing, the movement of the flap is increased in order to obtain a large cross section of passage.

According to another characteristic, the control rod ensures the guiding of the flap.

The invention also relates to an installation for remote control of inflation and deflation of one or more capacities; which has, for each capacity, a single pipeline connecting the control chamber to two branches, leading respectively to a source of fluid under pressure or to a source of negative pressure, with it possible for said pipeline to be put in connection also with a pressure measuring means and a drain line leading to the open air. An advantage of the valve according to the invention lies in the possibility of being able to control, in complete safety, very low values of pressure, for example, as low as $2 \times 10^4$ Pa.

Another advantage lies in the ability to function at high speed on the vehicle, even in the case of mounting in off-centered position on the wheels.

Yet another advantage lies in the ability to easily balance the pressures of two or more capacities, each having one or more valves and controlled from a single pipeline.

Various other characteristics emerge from the description given hereafter in reference to the appended drawings which show some forms of execution of the invention as nonlimiting examples.

DETAILED DESCRIPTION OF THE PREFERRED EMBODIMENTS

Figure 1:
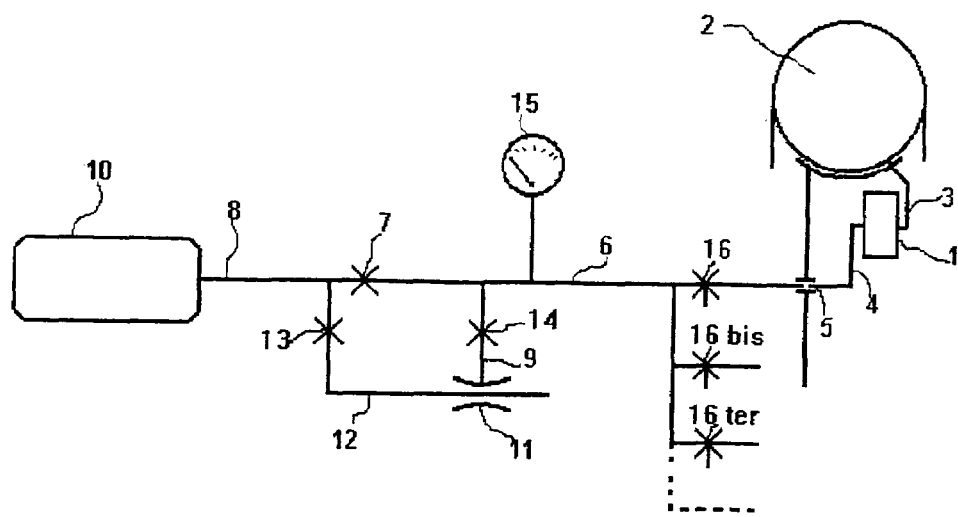
FIG. 1 is a diagrammatic view of an example of application of the object of the invention.

Represented in FIG. 1 is a pneumatic valve according to the invention, designated by reference (1), which is applied to the control of the pressure of tire (2) represented partially and mounted on a wheel of an automobile which is not represented. Valve 1 attached in off-center position on the wheel disk is connected to the tire by pipe (3), and to a drive and control installation which has pressure-vacuum source by pipeline (4) in rotation with the wheel, rotating joint (5), circuit (6) attached on the axles or the chassis of the vehicle. Circuit (6) is capable of being put in connection, by the intermediary of isolation valve (7), with source (8) for supplying fluid under pressure. Circuit (6) can also be put in connection with negative pressure source (9). As an illustration, the source of fluid under pressure can be pneumatic tank (10), which is itself supplied by a compressor which is not represented, and the negative pressure source will, for example, be a Venturi type liquid jet vacuum pump (11) which can be supplied by pressure source (8) by means of pipeline (12) controlled by isolation valve (13), while another isolation valve (14) makes it possible to put circuit (6) in connection with the negative pressure generated by the venturi. The drain line necessary for ensuring the isolation of the capacity and eliminating pressure on rotating joint (5) can advantageously be brought about by the opening of valve (14), valves (7) and (13) being closed. The control circuit can act on several capacities alternately or simultaneously; pipe (6) is then subdivided into as many branches as there are capacities to be controlled, with it possible for each branch to be isolated and opened to the open air by a three way valve 16, 16 bis, 16 ter.

Figure 2:
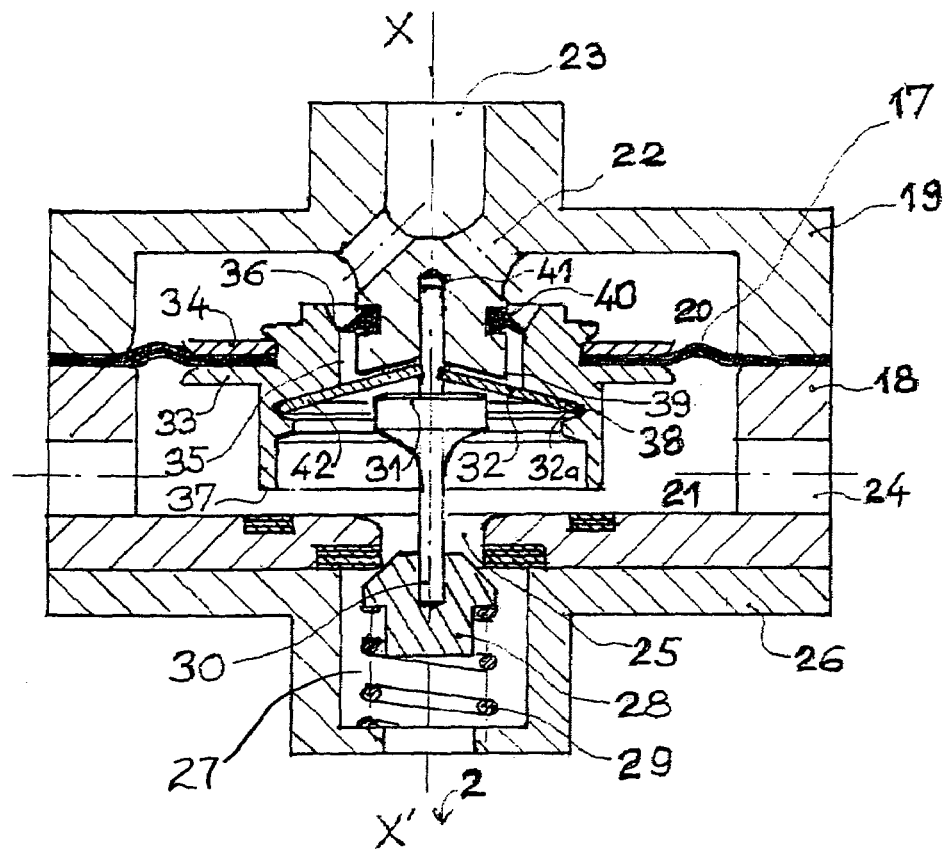
FIG. 2 is a vertical section showing the valve according to the invention according to a first embodiment.

According to FIG. 2, device 1 has membrane (17) gripped between body (18) and cover (19). Membrane (17) makes it possible to delimit, with cover (19), a first cavity (20) called control chamber, and with body (18), another second cavity (21) called outflow chamber. The first cavity (20) communicates, through two inclined holes (22) and well (23), with pipe (6), while the second cavity (21) can communicate, on one hand, with the atmosphere through openings (24), and on the other hand, with capacity (2) through pipe (25).

The assembly of membrane (17) with body (18) and cover (19) can be ensured by any suitable means, such as screwing, crimping, welding.

Preferably, the device is produced in such a way to be present in the form of a body generated by revolution having a main axis x–x' which, facilitates the production of the constitutive parts by turning.

The device furthermore has base (26) provided with well (27) in which flap (28) is housed. The flap (28), is preferably a truncated cone, which, with the assistance of elastic element (29) closes pipe (25). Flap (28) is extended by push rod (30) which is itself provided with plate (31) on which levers (32) are supported.

Membrane (17) has, attached in its center, cup (33), mounted in a sealed manner on the membrane by any suitable means, and for example, by ring (34) pressed and crimped on the cup.

Cup (33) has hole (35) extended on the side of chamber (20) by conical neck (36) and on the side of chamber (21) by cooler (37).

Inside hole (35) the cup furthermore has groove (38) in which ring (32 *a*) is housed. The ring (32 *a*) is attached to the end of the levers (32).

Cover (19) has protuberance (39) which advances inside hole (35) and which, along with the hole, makes an annular pipe. This protuberance is provided, at a well determined level, with sealing ring (40) whose exterior diameter is suited to hole (35).

This protuberance is also drilled in its center with blind hole (41) which is capable of receiving the end of push rod (30).

In the position as illustrated in FIG. 2, the so called rest position, the relative control pressure is zero, that is to say that circuit (6) is open to the open air, valves (7) and (13) being closed, with valves (14) and (16) open. Flap (28) closes pipe (25) by the action of elastic component (29), cup (33) attached to membrane (17) is in middle position between body (18) and cover (19); and under the action of the inherent elasticity of the membrane, and levers (32) maintained between maneuvering plate (31) and protuberance (39), the lip of sealing ring (40) is over hole (35), at the start of truncated conical neck (36).

In this position, the device establishes a sealed closure between capacity (2) and the surrounding environment.

In case of breaking of the drive pipeline during an inflation, deflation or measurement phase, control chamber (20) is again opened to the open air, and the isolation of capacity (2) is thus ensured as described above.

Figure 3:
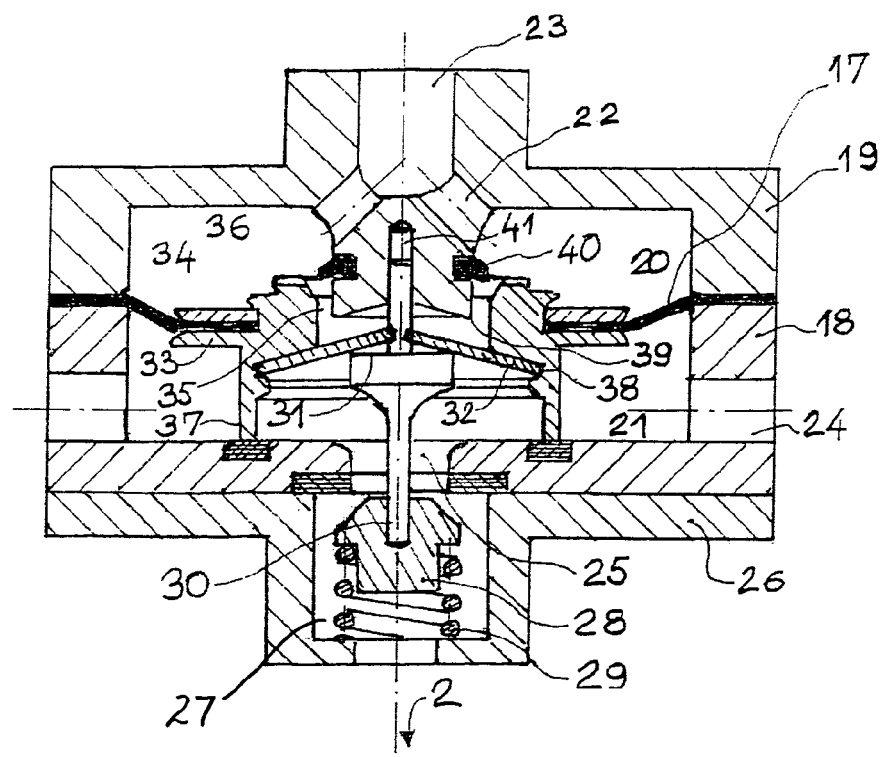
FIGS. 3 and 4 are sections illustrating two particular phases of functioning of this first embodiment.

When it is a matter of inflating capacity (2), valves (13) and (14) are closed, valves (13) and (16) are open. Under these conditions, the pressure rises rapidly in chamber (20) up to a sufficient value to bring about the deformation of membrane (17) and the movement of cup (33) in the direction of valve body (18). Thus, as emerges from FIG. 3, the pressure of the fluid coming from source (10) simultaneously brings about the resting of collar (37) on the bottom of valve body (18), then isolating outflow openings (24), and the opening of flap (28), due to the direct movement of push rod (30) by levers (32) resting without rocking on the exterior of plate (31).

Furthermore, sealing ring (40) moves away from neck (36), in that way allowing the fluid under pressure to run, with a small load loss, from control chamber (20) to capacity (2), traveling successively through the annular pipe arranged between hole (35) and protuberance (39), the interior of collar (37) and pipe (25).

In order to measure the pressure in capacity (2), it is sufficient, during an inflation operation, or after the beginning of inflation as described above, to close valve (7) so that the pressure is balanced between capacity (2) and pipe (6) because of the stopping of the flow of fluid and the corresponding load losses. The pressure can then be read on manometer (15) or recorded for processing with any other appropriate measuring means.

The stopping of an inflation operation is brought about by closing valve (8) and by opening valve (14). The relative pressure is then canceled in the control chamber, the membrane regains its rest position, and elastic means (29) simultaneously pushes back flap (28) to close pipe (25). The pressure coming from capacity (2) furthermore strengthens the closing and the seal of this flap.

Figure 4:
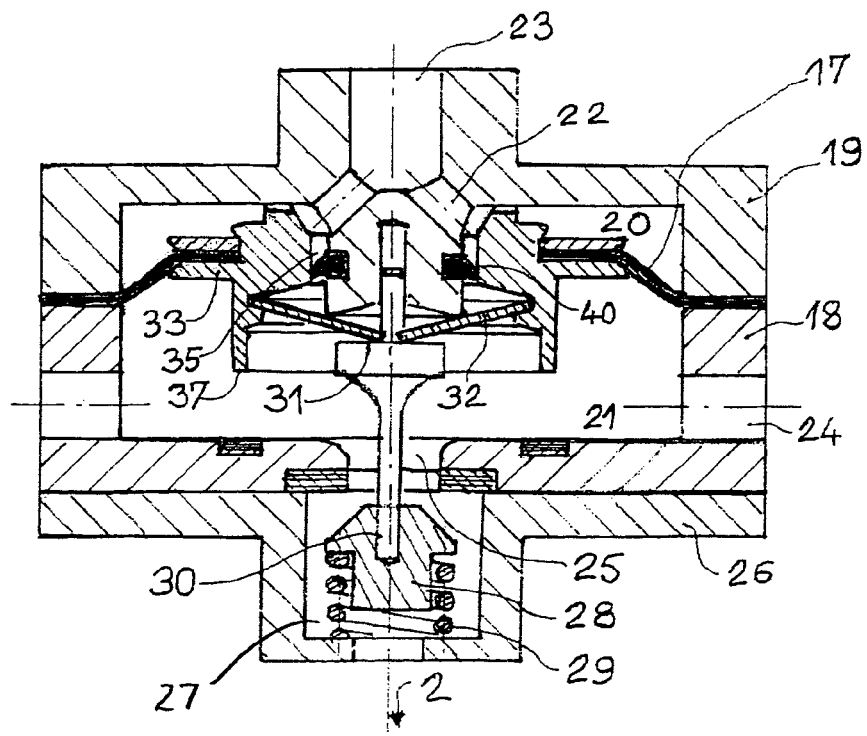

For deflating capacity (2), valve (7) is closed, valves (13), (14) and (16) are opened. The negative pressure generated from liquid jet vacuum pump (11) is transmitted to control chamber (20), membrane (17) deforms and brings about the movement of cup (33) in the direction of cover (19) until stopping against it. As emerges in FIG. 4, the movement of cup (33) brings about the resting of levers (32) on the exterior of protuberance (39) roughly at the level of the middle of said levers, bringing about the rocking of them. The free ends of levers (32) then come in contact with the edge of collar (37) and move push rod (30) to open flap (28).

During the movement of cup (33), sealing ring (40) remains in contact with hole (35) and closes the annular pipe arranged with protuberance (39) in order to maintain the negative pressure in control chamber (20) and isolate it from outflow chamber (21).

Thus, capacity (2) is put in connection with the atmosphere through chamber (21) and openings (24); collar (37) which moves away from the bottom of body (18) provides a large cross section of passage between pipe (25) and chamber (21) in order to obtain very rapid deflation.

Furthermore, the profiled shape of the bottom of maneuvering plate (31) promotes the flow of the fluid, limiting the turbulence and noise generated with outflow.

Stopping of the deflation is obtained by closing of valve (13); pipe (6) and control chamber (20) are then subjected to a zero relative pressure again; the elastic means pushes back flap (28) to closure and obliges push rod (30, levers (32) and cup (33) to return to the rest position.

Figure 5:
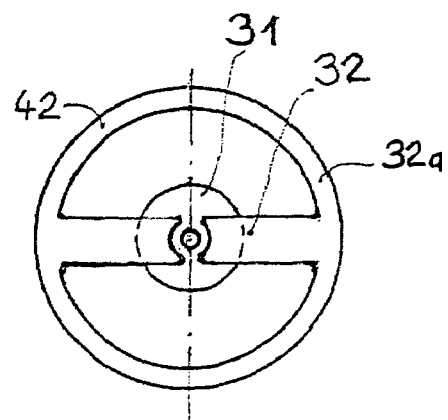
FIG. 5 is a partial view showing the shape of the levers and their attachment to the Belleville spring washer.

Represented in FIG. 5 is a top view of a form of execution of levers (32), of which there are preferably two, which are attached to Belleville spring washer (42), which has the advantage of maintaining the levers in a preferential rest position and of obtaining a spring effect with saddle curve. Consequently, the return to rest position after deflation is improved, while minimizing the value of the negative pressure which is necessary for opening of flap (28).

Figure 6:
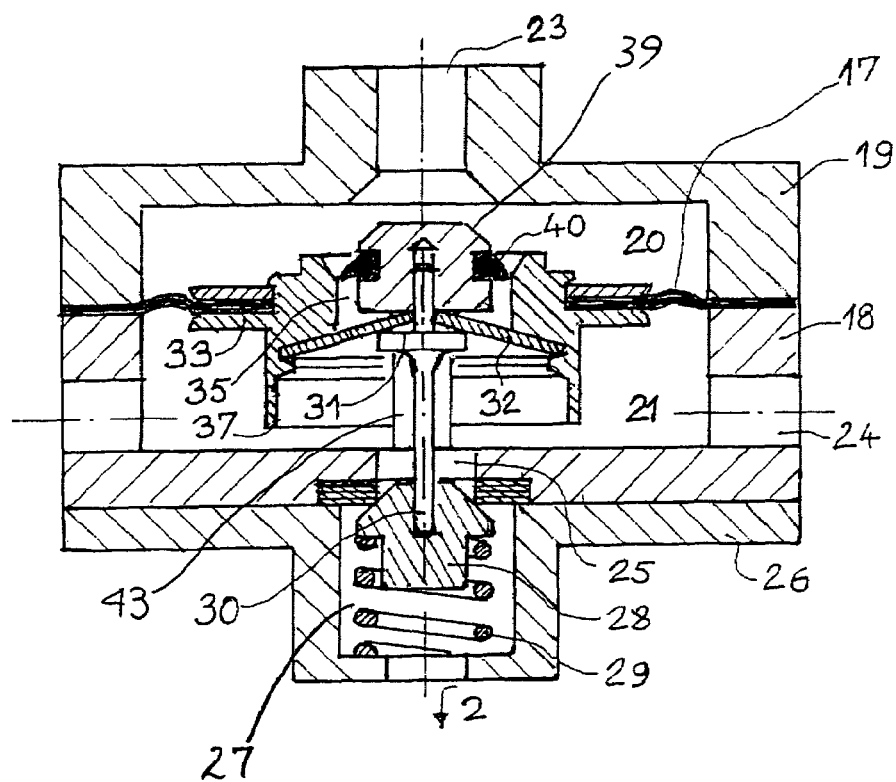
FIG. 6 is a vertical section similar to FIG. 2, illustrating another embodiment.

An execution variant of device 1 is represented in FIG. 6, according to which protuberance (39) is no longer connected to cover (19) but rather to body (18) by two feet (43).

According to a variant which is not illustrated, levers (32) can be attached on protuberance (39) by hinge pins; the exterior ends of the levers are then free in groove (38) and are not connected to a ring.

The invention is not limited to the examples described and represented, since various modifications can be made to them without leaving the scope of the invention; in particular, the levers can be placed in the control chamber, can be actuated by washer (34) and act on an intermediate push rod resting on the maneuvering plate; the opening of flap (28) in inflation is then obtained by the action of fingers integrated in the cup, running out of hole (35) and resting directly on maneuvering plate (31).

The invention claimed is:

1. A controlled pneumatic valve, intended for remote control of the inflation and deflation of a capacity, the valve comprising:
    a membrane structure, maintained between a valve body which has openings and a cover, said membrane structure and said cover defining on one hand a control chamber, and said membrane structure and said body defining on the other hand an outflow chamber, said membrane structure being movable between a first position permitting fluid communication between said outflow chamber and the capacity while at the same time isolating said outflow chamber from said control chamber, and a second position permitting fluid communication between said control chamber and the capacity, while at the same time closing the outflow chamber;
    at least one lever which rests on a stationary part of said cover or of said body for reversing the direction of the force provided by said membrane structure during application of a negative pressure in said control chamber; and
    a flap coupled to said lever, said lever ensuring the opening of said flap under the action of a positive control pressure as well as a negative control pressure in said control chamber with respect to the ambient pressure.

2. A controlled pneumatic valve according to claim 1, wherein said stationary part for providing a point of support of said lever is present in the form of a protuberance which advances inside a hole of said membrane structure and with this hole, makes an annular pipe.

3. A controlled pneumatic valve according to claim 2, wherein said protuberance carries a sealing ring arranged so as to close the annular pipe between said hole and said protuberance during said action of said negative relative pressure.

4. A controlled pneumatic valve according to claim 1, wherein said lever is connected to a ring housed in a groove of a cup of said membrane structure.

5. A controlled pneumatic valve according to claim 4, wherein said ring is in the form of a Belleville spring washer.

6. A controlled pneumatic valve according to claim 1, wherein said lever is part of a Belleville spring washer.

7. A controlled pneumatic valve according to claim 1, wherein said lever is coupled to said flap via a push rod having a maneuvering plate.

8. A controlled pneumatic valve according to claim 7, wherein said lever is oriented on said maneuvering plate at the beginning of a deflation course of travel so as to provide a high lever arm ratio.

9. A controlled pneumatic valve according to claim 7, wherein said push rod is maintained guided on its axis by a hole made in a protuberance of said cover.

10. A controlled pneumatic valve according to claim 3, wherein the position of said sealing ring with respect to a truncated conical neck of a cup of said membrane structure offers small resistance to the passage of the fluid during an inflation phase or a measurement phase.

11. An installation for remote control of inflation and deflation of a capacity, which has a pipeline which can be put in connection, by the intermediary of valves or selective control valves, with a source of pressure-vacuum, and pressure measuring means, the installation having at least one controlled valve comprising:
- a valve housing defining an interior and having an outlet in communication with said interior;
- a cup movably disposed within said housing interior;
- a flexible membrane connecting said cup to said housing, said membrane along with said cup dividing said housing interior into a control chamber and an outflow chamber;
- a lever element supported in said cup; and
- a flap coupled to said lever element and releasably seated in said housing outlet, wherein, upon application of a positive pressure in said control chamber, said cup moves to a first position wherein said lever element displaces said flap from said housing outlet and said cup permits fluid communication therethrough between said control chamber and said outlet, and wherein, upon application of a negative pressure in said control chamber, said cup moves to a second position, wherein said lever element displaces said flap from said housing outlet and said cup permits fluid communication between said outflow chamber and said outlet.

12. A pneumatic valve comprising:
- a valve housing defining an interior and having an outlet in communication with said interior;
- a cup movably disposed within said housing interior;
- a flexible membrane connecting said cup to said housing, said membrane along with said cup dividing said housing interior into a control chamber and an outflow chamber;
- a lever element supported in said cup; and
- a flap coupled to said lever element and releasably seated in said housing outlet, wherein, upon application of a positive pressure in said control chamber, said cup moves to a first position wherein said lever element displaces said flap from said housing outlet and said cup permits fluid communication therethrough between said control chamber and said outlet, and wherein, upon application of a negative pressure in said control chamber, said cup moves to a second position, wherein said lever element displaces said flap from said housing outlet and said cup permits fluid communication between said outflow chamber and said outlet.

* * * * *